(12) United States Patent
Sakuma

(10) Patent No.: US 8,503,068 B2
(45) Date of Patent: Aug. 6, 2013

(54) RADIATION SOURCE APPARATUS AND DUV BEAM GENERATION METHOD

(75) Inventor: Jun Sakuma, Kanagawa (JP)

(73) Assignee: Lasertec Corporation, Kanagawa (JP)

( * ) Notice: Subject to any disclaimer, the term of this patent is extended or adjusted under 35 U.S.C. 154(b) by 377 days.

(21) Appl. No.: 13/075,797

(22) Filed: Mar. 30, 2011

(65) Prior Publication Data

US 2012/0026578 A1 Feb. 2, 2012

(30) Foreign Application Priority Data

Apr. 1, 2010 (JP) ................................ 2010-085070

(51) Int. Cl.
*G02F 1/35* (2006.01)
*H01S 3/10* (2006.01)

(52) U.S. Cl.
USPC ............................ 359/328; 359/329; 372/22

(58) Field of Classification Search
USPC ........................................... 359/328; 372/22
See application file for complete search history.

(56) References Cited

U.S. PATENT DOCUMENTS

| 5,742,626 | A | 4/1998 | Mead et al. |
| 6,373,869 | B1 | 4/2002 | Jacob |
| 6,477,188 | B1 | 11/2002 | Takaoka et al. |
| 7,471,705 | B2 | 12/2008 | Gerstenberger et al. |
| 7,593,437 | B2 | 9/2009 | Staroudoumov et al. |
| 7,852,549 | B2 * | 12/2010 | Alekel et al. ................. 359/328 |
| 2006/0291862 | A1 * | 12/2006 | Kawai ............................. 398/79 |
| 2007/0064749 | A1 * | 3/2007 | Kaneda et al. .................. 372/21 |

FOREIGN PATENT DOCUMENTS

| JP | 10-341054 | A | 12/1998 |
| JP | 11-251666 | A | 9/1999 |
| JP | 11-258645 | A | 9/1999 |
| JP | 2000-162655 | A | 6/2000 |
| JP | 2000-200747 | A | 7/2000 |
| JP | 2002-099007 | A | 4/2002 |
| JP | 2002-258339 | A | 9/2002 |

(Continued)

OTHER PUBLICATIONS

Sakuma et al., "CW DUV light sources for inspection tools", 25th Annual BACUS Symposium on Photomask Technology 3-7, Oct. 2005, paper 5992-139.

(Continued)

*Primary Examiner* — Hemang Sanghavi
(74) *Attorney, Agent, or Firm* — Carrier Blackman & Associates, P.C.; Joseph P. Carrier; William D. Blackman

(57) ABSTRACT

The present invention provides a radiation source apparatus which can generate a DUV radiation beam having a wavelength of 193.4 nm efficiently. The radiation source apparatus according to the invention has first wavelength conversion means arranged to receive a first laser beam of a first fundamental wavelength and to generate a fourth-harmonic wavelength of the first fundamental wavelength, second wavelength conversion means arranged to receive the beam of the fourth-harmonic wavelength of the first fundamental wavelength (266 nm) and a second laser beam of a second fundamental wavelength and to sum-frequency mix the fourth-harmonic with the second fundamental wavelength radiation to generate a beam of second DUV radiation having a wavelength between approximately 232 nm and 237 nm, and third wavelength conversion means arranged to receive the beam of second DUV radiation and the third laser beam of a third fundamental wavelength and to sum-frequency mix the second DUV radiation with the third fundamental wavelength radiation to generate third DUV radiation having a wavelength between approximately 192.5 nm and 194.5 nm.

23 Claims, 14 Drawing Sheets

FOREIGN PATENT DOCUMENTS

| | | | |
|---|---|---|---|
| JP | 2004-086193 | A | 3/2004 |
| JP | 2007-086108 | A | 4/2007 |
| JP | 2009-513995 | A | 4/2009 |
| JP | 2009-540538 | A | 11/2009 |
| JP | 2010-050389 | A | 3/2010 |
| WO | 99/14631 | A1 | 3/1999 |

OTHER PUBLICATIONS

H. Zhang et al., "175 to 210 nm widely tunable deep-ultraviolet light generation based on KBBF crystal," Applied Physics B: Lasers and Optics, vol. 93, Nos. 2-3, pp. 323-326 (2008), Springer Berlin/Heidelberg.

V.G. Dmitriev, G.G. Gurzadyan and D.N. Nikogosyan, "Handbook of Nonlinear Optical Crystals," Springer-Verlag, New York, 1995.

Yoshimura et al., J. Plasma Fusion Res. vol. 85, No. 5, 243-246, 2009.

Y. K. Yap et al., "Long-term operation of CsLiB6O10 at elevated crystal terperature," Opt. Lett. 23, 34-36 (1998).

Pan Feng et al., "Cracking Mechanism of CLBO crystals at room temperature," Journal of Crystal Growth, vol. 241, pp. 129-134, 2002.

Actinix Co. Homepage, Model 3193 [Mar. 29, 2010 search], Internet http://www.actinix.com/model%203193.htm.

J. Sakuma et al., "(Invited paper) High-power, CW, Deep-UV Coherent Light Sources Around 200-nm Based on External Resonant Sum-frequency Mixing," IEEE Selected Topics in Quantum Electronics, vol. 10, pp. 1244-1251 (2004).

Nikon Homepage, 193 nm solid state laser [Mar. 29, 2010 search], Internet http://www.ave.nikon.co.jp/cp/products_sys4.html.

* cited by examiner

| Crystal | Temp. | Incident beam wavelength (nm) | | Generated beam wavelength (nm) | Cut angle | Deff (pm/V) | h | Conversion coefficient (W-1) | Reflection loss |
|---|---|---|---|---|---|---|---|---|---|
| | | Long wavelength side | Short wavelength side | | | | | | |
| CLBO | 100°C | 2100 | 213 | 193.4 | θ=51.1° | 0.897 | 0.044 | 0.00027 | 0.232 |
| CLBO | 100°C | 1554 | 220.9 | 193.4 | θ=61.3° | 0.997 | 0.055 | 0.00053 | 0.213 |
| CLBO | 100°C | 1417 | 224 | 193.4 | θ=65.4° | 1.03 | 0.058 | 0.00067 | 0.209 |
| CLBO | 100°C | 1096 | 234.9 | 193.4 | θ=90° | 1.11 | 1.06 | 0.018 | 0.196 |

FIG. 3

| Crystal | Temp. | Incident beam wavelength (nm) | | Generated beam wavelength (nm) | Cut angle | Deff (pm/V) | h | Conversion coefficient (W-1) | Reflection loss |
|---|---|---|---|---|---|---|---|---|---|
| | | Long wavelength side | Short wavelength side | | | | | | |
| BBO | 27°C | 2009 | 266 | 2349 | θ=34.5° | 2.4 | 0.024 | 0.0012 | 0.01 |
| LBO | 52°C | 2009 | 266 | 2349 | θ=0° | 0.829 | 1.08 | 0.0058 | 0.01 |
| CLBO | 100°C | 2009 | 266 | 2349 | θ=45.4° | 0.858 | 0.053 | 0.00022 | 0.194 |
| BBO | 27°C | 1547 | 277 | 2349 | θ=38.8° | 2.25 | 0.022 | 0.00093 | 0.01 |
| LBO | 27°C | 1547 | 277 | 2349 | θ=47° | 0.571 | 0.17 | 0.00049 | 0.01 |
| CLBO | 100°C | 1547 | 277 | 2349 | θ=52.9° | 0.806 | 0.056 | 0.00026 | 0.194 |

FIG. 6

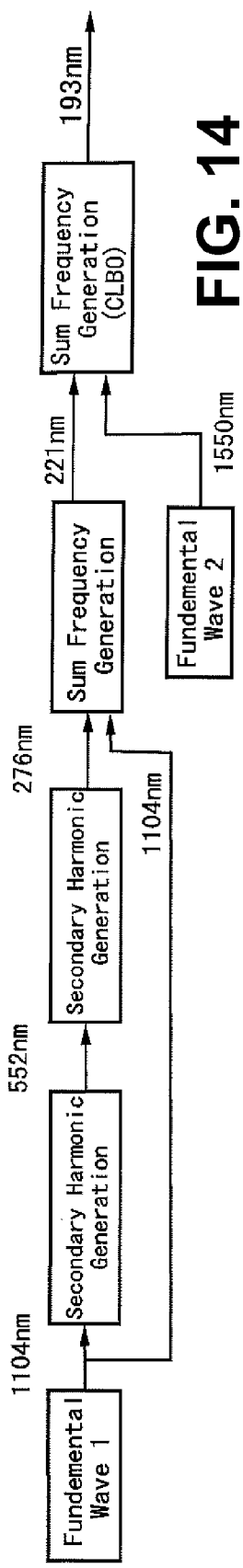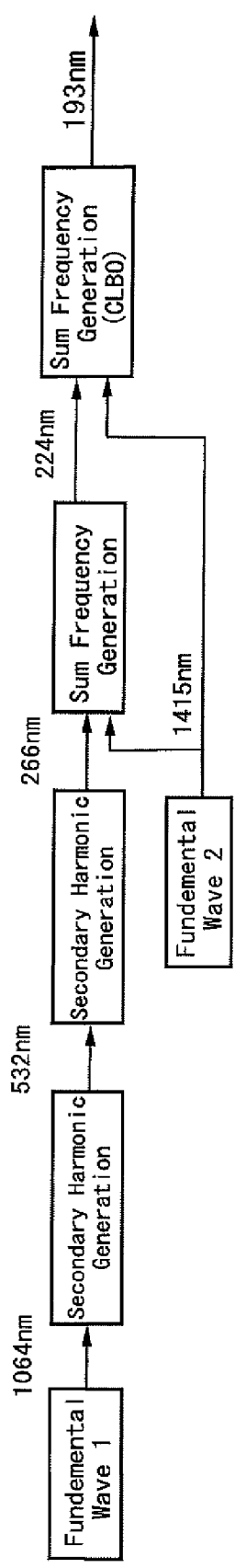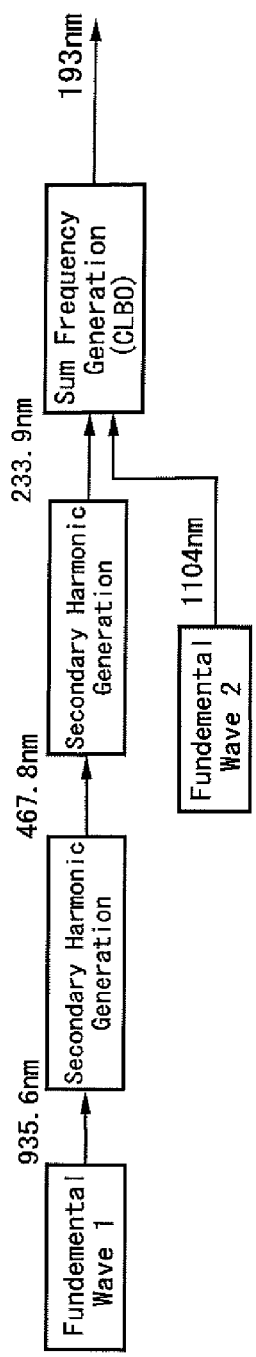
FIG. 14
FIG. 15
FIG. 16

US 8,503,068 B2

RADIATION SOURCE APPARATUS AND DUV BEAM GENERATION METHOD

TECHNICAL FIELD

The present invention relates to the art of wavelength conversion utilizing a nonlinear optical effect, in particular a radiation apparatus which generates a deep ultraviolet region wavelength beam.

Furthermore, the present invention relates to a method of generation of a DUV (deep ultraviolet) beam corresponding to the oscillation wavelength of an ArF excimer laser.

BACKGROUND ART

Due to the improvements made in the performance of semiconductor integrated circuits, the circuit patterns which are drawn on an exposure photomask plate have become increasingly finer and higher in integration. In the production of such semiconductor devices, an inspection apparatus for detecting fine defects in the photomask plate and the circuit patterns which are formed in the plate has become necessary. For inspection of the cutting edge semiconductor exposure mask in which a DUV beam of wavelength near 193.4 nm from an exposure beam source constituted by an ArF excimer laser is used, inspection apparatuses which uniformly emit continuous or high speed repeating pulse output DUV beams, capture images of the patterns by CCD cameras etc., and process the obtained data are being used.

The wavelength of the DUV beam of an inspection apparatus is preferably as short as possible from the viewpoint of the improvement of resolution. On the other hand, shortening the inspection time in the production process is also important. For this reason, it is sought to raise the output of the inspection-use DUV radiation source and make it repeat at a super high speed so as to eliminate the need for synchronization with the CCD cameras etc., ideally to make it continuous. Further, as beam output, about 100 mW is necessary. For such a high output, continuous output DUV radiation source, the method of using a nonlinear optical crystal for wavelength conversion has been pursued as the only practical approach.

The fourth harmonic (wavelength 266 nm) of the fundamental wave emitted from a neodymium (Nd)-doped solid state laser or fiber laser (or fiber amplifier), the second harmonic (257 nm, 244 nm) of the fundamental wave emitted from an argon ion laser, etc. are typical outputs used, but in recent years, less than 200 nm DUV beams have been considered necessary. For example, the wavelength 198.5 nm continuous output DUV radiation source shown in PLT 1 is known. With this system, as described in NPLT 1, so far as the inventors know, this is currently the only continuous output DUV radiation source in which generation of a 100 mW or more beam by a wavelength of less than 200 nm has been reported. However, if a beam source enabling continuous output at near 193.4 nm—equal to the wavelength of an ArF excimer laser—can be practically produced as a DUV radiation source of a mask inspection apparatus, it would enable accurate evaluation of defects at the exposure wavelength. This would be far more useful than in the past and would greatly contribute to cutting edge semiconductor production.

To obtain a ultraviolet beam having a wavelength of 193.4 nm by wavelength conversion, it is possible to use one or more laser beam sources as the fundamental waves and combine these with generation of their harmonics or sum frequency mixing. In the past, various proposals have been made for systems for generation of 193.4 nm beams. However, the only systems by which actual generation of a 193.4 nm beam has been reported use pulse oscillation. So far as the inventors known, no continuous output beam source has been reported. There are various reasons, but this frankly means that no technically feasible system has been discovered which combines a laser beam source and nonlinear optical crystal to obtain a practical continuous output 193.4 nm beam.

In general, to generate a high output ultraviolet beam by wavelength conversion, it is required that (1) there be a nonlinear optical crystal which satisfies the phase matching conditions utilizing birefringence for the beam wavelengths for generation of harmonics and sum frequency mixing, (2) the conversion coefficient which is determined by the physical constants etc. of the crystal be high, (3) there be little absorption by the crystal at the generated wavelength, etc. As crystals which enable the generation of wavelength 193.4 nm beams, BBO (β-BaB2O4), LBO (LiB3O5), CLBO (CsLiB6O10), KBBF (KBe2BO3F2), etc. are known.

Among these, KBBF is currently the only crystal for which phase matching has been reported for the process of generation of a 193.4 nm beam by generation of the second harmonic of a wavelength 386.8 nm fundamental wave. However, it includes toxic substances and is difficult to grow as a crystal, so there is no prospect for practical use for consumer applications (NPLT 2). To obtain phase matching for generation of a 193.4 nm beam using other crystals, it is necessary to rely on sum frequency mixing of a long wavelength beam $\lambda 1$ ($\lambda 1 > 386.8$ nm) with a wavelength longer than 386.8 nm and a short wavelength beam $\lambda 2$ ($\lambda 2 < 386.8$ nm) with a wavelength shorter than 386.8 nm. The two wavelength beams $\lambda 1$ and $\lambda 2$ have to satisfy the following equation (1).

$$1/\lambda 1 + 1/\lambda 2 = 1/193.4 \quad (1)$$

Further, the phase matching conditions are expressed by the following equation (2) in the case of the usual co-linear type required for high efficiency wavelength conversion:

$$n1/\lambda 1 + n2/\lambda 2 = n3/193.4 \quad (2)$$

$n1$, $n2$, and $n3$ are the refractive indexes of the crystal at the wavelengths $\lambda 1$, $\lambda 2$, and 193.4 nm.

As systems which have been proposed in the past for combination of wavelengths in sum frequency mixing which satisfy the above conditions, there are the following examples.
(1) System by sum frequency mixing of $\lambda 1 = 2.075$ μm and $\lambda 2 = 213$ nm (FIG. 11: PLT 2),
(2) System by sum frequency mixing of $\lambda 1 = 1.55$ μm and $\lambda 2 = 221$ nm (FIG. 12: PLT 3, FIG. 13: PLT 4 and PLT 5, FIG. 14: PLT 6 and PLT 7),
(3) System by sum frequency mixing of $\lambda 1 = 1.415$ μm and $\lambda 2 = 224$ nm (FIG. 15: PLT 5),
(4) System by sum frequency mixing of $\lambda 1 = 1105$ nm and $\lambda 2 = 234$ nm (FIG. 16: PLT 6, FIG. 17: PLT 7),
(5) System by sum frequency mixing of $\lambda 1 = 1064$ nm and $\lambda 2 = 236$ nm (FIG. 18: PLT 8, FIG. 19: PLT 9 and PLT 10),
(6) System by sum frequency mixing of $\lambda 1 = 710$ nm and $\lambda 2 = 266$ nm (FIG. 20: PLT 11, PLT 12, PLT 13, PLT 14)
(7) System by sum frequency mixing of $\lambda 1 = 740$ to 790 nm and $\lambda 2 = 256$ to 262 nm (PLT 15).

CITATION LIST

Patent Literature

PLT 1: Japanese Patent Publication (A) No. 2002-258339
PLT 2: U.S. Pat. No. 5,742,626
PLT 3: Japanese Patent Publication (A) No. 2000-200747
PLT 4: U.S. Pat. No. 7,593,437
PLT 5: Japanese Patent Publication (A) No. 2007-86108

PLT 6: Japanese Patent Publication (A) No. 2009-540538
PLT 7: Japanese Patent Publication (A) No. 2004-086193
PLT 8: Japanese Patent Publication (A) No. 11-251666
PLT 9: Japanese Domestic Republication (A1) No. 99/014631
PLT 10: Japanese Patent Publication (A) No. 2000-162655
PLT 11: Japanese Patent Publication (A) No. 10-341054
PLT 12: Japanese Patent Publication (A) No. 11-258645
PLT 13: Japanese Patent Publication (A) No. 2002-99007
PLT 14: U.S. Pat. No. 6,373,869
PLT 15: Japanese Patent Publication (A) No. 2010-50389
PLT 16: U.S. Pat. No. 7,471,705
PLT 17: Japanese Patent Publication (A) No. 2009-513995

Nonpatent Literature

NPLT 1: J. Sakuma, Y. Okada, T. Sumiyoshi, H. Sekita, M. Obara, "CW DUV light sources for inspection tools," 25th Annual BACUS Symposium on Photomask Technology 3-7 Oct. 2005, paper 5992-139.
NPLT 2: H. Zhang et al., "175 to 210 nm widely tunable deep-ultraviolet light generation based on KBBF crystal," Applied Physics B: Lasers and Optics, Volume 93, Numbers 2-3, pp. 323-326 (2008), Springer Berlin/Heidelberg
NPLT 3: V. G. Dmitriev, G. G. Gurzadyan and D. N. Nikogosyan, "Handbook of Nonlinear Optical Crystals," Springer-Verlag, New York, 1995.
NPLT 4: Yoshimura et al., J. Plasma Fusion Res. Vol. 85, No. 5, 243-246, 2009
NPLT 5: Y. K. Yap, T. Inoue, H. Sakai, Y. Kagebayashi, Y. Mori, T. Sasaki, K. Deki, and M. Horiguchi, "Long-term operation of CsLiB6O10 at elevated crystal temperature," Opt. Lett. 23, 34-36 (1998)
NPLT 6: Pan Feng, Wang Xiaoqing, Shen Guangqiu, and Shen Dezhong, "Cracking Mechanism of CLBO crystals at room temperature," Journal of Crystal Growth, Vol. 241, pp. 129-134, 2002,
NPLT 7: Actinix Co. homepage, Model 3193 [Mar. 29, 2010 search], Internet <URL: http://www.actinix.com/model%203193.htm>
NPLT 8: J. Sakuma, Y. Asakawa, T. Sumiyoshi, and H. Sekita, "(Invited paper) High-power, CW, Deep-UV Coherent Light Sources Around 200-nm Based on External Resonant Sum-frequency Mixing," IEEE Selected Topics in Quantum Electronics, vol. 10, pp. 1244-1251 (2004).
NPLT 9: Nikon homepage, 193 nm solid state laser [Mar. 29, 2010 search], Internet <URL: http://www.ave.nikon.co.jp/cp/products_sys4.html>

SUMMARY OF INVENTION

Technical Problem

Whether the LBO, CLBO, and BBO crystals perform phase matching for sum frequency mixing and, further, the method of calculation of the characteristics when performing phase matching are described in NPLT 3 etc. According to this, a BBO crystal performs phase matching for the sum frequency mixing shown in the above (1) to (6). CLBO has an absorption end of 180 nm and has little absorption at the wavelength 193.4 nm as well, but its birefringence is smaller than those of KBBF and BBO, so the combination of wavelengths for sum frequency mixing satisfying the phase matching conditions is limited.

However, as an example of generation of a DUV beam using a CLBO crystal, while pulsed, it is considered that generation of an output 500 mW beam is possible by the system shown in FIG. 13 (NPLT 4). Further, while a wavelength of 198.5 nm, generation of a 300 mW beam by continuous output by sum frequency mixing of $\lambda 1=1064$ nm and $\lambda 2=244$ nm has been reported (NPLT 1). LBO has a smaller nonlinear optical constant than CLBO. Even when phase matching is possible, use of CLBO for generation of a high output, less than 200 nm DUV beam is difficult. Under such a state, to generate a 100 mW or higher DUV beam by a wavelength of 200 nm or less, sum frequency mixing enabling utilization of a CLBO crystal can be said to be an essential condition.

For sum frequency mixing using a CLBO crystal, PLT 9 proposes an apparatus which generates a beam of a wavelength of about 193 nm by sum frequency mixing of a harmonic of a laser beam source of a wavelength of 1000 to 1800 nm and a beam which is emitted from a coherent beam source excited by this harmonic. For example, it describes generation of a 193 nm DUV beam by sum frequency mixing of a 1064 nm wavelength beam and 235.8 nm wavelength beam and by sum frequency mixing of a 1047 nm wavelength beam and a 236.6 nm wavelength beam. However, in PLT 10, proposed later by the same inventors etc., it is stated that the above sum frequency mixing by a CLBO crystal is unrealizable, that if cooling the crystal down to −180° C. to change the refractive index, non-critical phase matching (NCPM) type sum frequency mixing of a 236.3 nm wavelength beam and a 1064 nm wavelength beam just barely becomes possible, and that a 193.439 nm DUV beam can be generated. However, a CLBO crystal is usually utilized while being heated to 100° C. or more so as to prevent deterioration due to hygroscopicity (for example, NPLT 5). Further, there have been many reports that even if used at room temperature, much less −180° C., the crystal cracks and can no longer be used (for example, NPLT 6).

Therefore, cooling a CLBO crystal to −180° C. cannot be said to be a practical method. PLT 16 proposes use of sum frequency mixing of the fourth harmonic (about 250 nm) of a beam source near 1000 nm and the fundamental wave by a CLBO crystal (that is, generation of a fifth harmonic) so as to efficiently generate a close to 200 nm DUV beam. This PLT describes sum frequency mixing of a $\lambda 1=1090$ nm wavelength beam and the $\lambda 2=236$ nm which is generated by generation of the fourth harmonic of the wavelength 944 nm beam to efficiently generate a 194 nm DUV beam. However, it describes that there is no concrete means for constructing a laser beam source which generates a 944 nm wavelength beam and that the ideal 193.4 nm is not achieved.

PLT 17 also shows a substantially similar configuration. It describes that a 199.7 nm DUV beam is efficiently generated by generation of the fifth harmonic of a wavelength 998 nm laser beam and, further, that sum frequency mixing of the $\lambda 2=238.666$ nm which is obtained by generation of the fourth harmonic of a wavelength 1193.33 nm laser beam and $\lambda 1=1064$ nm can be used to generate a wavelength 194.9 nm DUV beam, but again 193.4 nm is not achieved.

In this way, as systems of sum frequency mixing enabling generation of a wavelength 193.4 nm DUV beam using a CLBO crystal, what have been proposed up to now, among the above-mentioned systems, have been the four systems of the above (1) sum frequency mixing of a 2.1 μm wavelength beam and 213 nm wavelength beam, (2) sum frequency mixing of a 1.55 μm wavelength beam and a 221 nm wavelength beam, (3) sum frequency mixing of a 1.44 μm wavelength beam and a 223 nm wavelength beam, and (4) sum frequency mixing of a 1.105 μm wavelength beam and a 234.4 nm wavelength beam.

Among these, in the system using sum frequency mixing of a 2.1 μm wavelength beam and a 213 nm wavelength beam (shown in FIG. 11), a pulse generation type beam source which generates a wavelength 193.4 nm DUV beam is commercially available (NPLT 7: however, for 193 nm generation, using BBO crystal). Further, generation of a continuous output 213 nm DUV beam is reported in NPLT 8, but the ability to generate a 193.4 nm DUV beam is not reported.

Further, as the system of (2), a radiation source which uses generation of the eighth harmonic using a fiber amplifier which emits a 1.554 μm wavelength beam as the basic beam source (shown in FIG. 12) so as to generate, while pulsed, a wavelength 193.0 nm DUV beam has been developed (NPLT 9). However, generation of a DUV beam is not reported with the systems of (3) and (4). In particular, generation of a continuous output 193.4 nm DUV beam has not been reported at all in a theoretically feasible system. One of the reasons is that while generation of a 193.4 nm DUV beam is theoretically feasible, there is no laser beam source of the output required for construction of a practical radiation apparatus. For example, the beam source which emits a 1.44 μm wavelength laser beam which is used in the system of the above (3) and the laser beam source which emits a 1.105 μm wavelength laser beam which is used in the system of the above (4) are difficult to be raised in output due to the low gain and other reasons even if generation is possible. Further, usually an external resonator is used for realizing efficient wavelength conversion by a low strength continuous output, but a 193.4 nm beam source which requires a four- or five-stage wavelength conversion process complicates the hardware and makes generation of a stable and high quality beam suitable for practical use difficult.

PLT 14 proposes a concrete example of the configuration for generation of a continuous output 193.4 nm DUV beam based on this point. However, this conventional radiation apparatus is based on the system of the above (7). To generate a 193.4 nm DUV beam, it is only possible to use a BBO crystal. Stabilization is difficult. Further, even in a system using a CLBO crystal to generate a 193.4 nm DUV beam, the conversion efficiency is low, so the output of the laser beam source becomes extremely large. It has been judged that this system could not be put into practical use in view of the structural size and manufacturing cost.

PLT 6 describes using a 1104 nm wavelength beam and a 233.9 nm wavelength beam for sum frequency mixing by a non-critical phase matching CLBO crystal so as to generate a 193.0 nm DUV beam. In this publication, as the method for generation of a 233.9 nm DUV beam, generation of the fourth harmonic of a 935.6 nm wavelength beam from an Nd-doped amplifier may be mentioned. However, a 935.6 nm laser operation by an Nd-doped amplifier is a three-level system, so generation of a high output beam is extremely difficult. In this way, in the prior art, there was the problem that it was not possible to efficiently generate a 193.4 nm wavelength or nearby DUV beam.

An object of the present invention is to realize a radiation source apparatus and DUV beam generation method able to efficiently generate a DUV beam.

Solution to Problem

In some embodiments, the invention provides a radiation source apparatus for generating deep ultraviolet (DUV) radiation having a wavelength of 193.4 nm or around 193.4 nm. A radiation source apparatus according to the invention has a first laser apparatus for generating a first laser beam of radiation having a first fundamental wavelength between approximately 1060 nm and 1080 nm;

a second laser apparatus for generating a second laser beam of radiation having a second fundamental wavelength between approximately 1750 nm and 2100 nm;

a third laser apparatus for generating a third laser beam of radiation having a third fundamental wavelength between approximately 1080 nm and 1120 nm;

first wavelength conversion means arranged to receive the first laser beam of radiation and to generate a beam of first DUV radiation having a fourth-harmonic wavelength of the first fundamental wavelength;

second wavelength conversion means arranged to receive the beam of first DUV radiation and the second laser beam of radiation and to sum-frequency mix the first DUV radiation with the second fundamental wavelength radiation to generate a beam of second DUV radiation having a wavelength between approximately 232 nm and 237 nm; and third wavelength conversion means arranged to receive the beam of second DUV radiation and the third laser beam of radiation and to sum-frequency mix the second DUV radiation with the third fundamental wavelength radiation to generate third DUV radiation having a wavelength between approximately 192.5 nm and 194.5 nm.

In a preferred embodiment, the first wavelength conversion means generate the first DUV radiation having the wavelength of 266 nm or around 266 nm, and the third wavelength conversion means generate the third DUV radiation having the wavelength of 193.4 nm or around 193.4 nm.

In a preferred embodiment, the second laser apparatus generates the second laser beam of radiation having the wavelength between 1940 nm and 2010 nm, the third laser apparatus generates the third laser beam of radiation having the wavelength between 1096 nm and 1111 nm, and the second wavelength conversion means generate the second DUV radiation having the wavelength between 234.1 nm and 234.9 nm.

In an another preferred embodiment, the second wavelength conversion means include a nonlinear crystal which is selected from the group consisting of BBO (β-BaB2O4) crystal and LBO (LiB3O5) crystal.

In an another preferred embodiment, said second wavelength conversion means include the BBO crystal, and the third wavelength conversion means include the CLBO (CsLiB6O10) crystal.

In an another preferred embodiment, the second wavelength conversion means include the LBO crystal, and the third wavelength conversion means include the CLBO crystal.

In an another preferred embodiment, the first wavelength conversion means include two serially arranged nonlinear crystals to generate the fourth harmonic wavelength of the first fundamental wavelength.

In an another preferred embodiment, the first, second and third laser apparatuses generate continuous outputs, respectively, and the third wavelength conversion means generate the continuous output having the wavelength of 193.4 nm or around 193.4 nm.

The present invention provides a method for generating deep ultraviolet (DUV) radiation having a wavelength which is substantially equal to a wavelength of laser radiation emitted from an ArF excimer laser. The method of the invention, comprising the steps of:

a frequency multiplying step of receiving a first laser beam of radiation having a first fundamental wavelength between 1060 nm and 1080 nm, and generating a beam of first DUV radiation having a fourth harmonic wavelength of the first fundamental wavelength:

a first sum frequency mixing step of receiving the beam of the first DUV radiation and a second laser beam of radiation having a second fundamental wavelength between 1750 nm and 2100 nm, and sum frequency mixing the first DUV radiation with the second fundamental wavelength radiation to generate second DUV radiation having a wavelength between 232 nm and 237 nm: and a second sum frequency mixing step of receiving the beam of the second DUV radiation and a third laser beam of radiation having a third fundamental wavelength between 1080 nm and 1120 nm, and sum frequency mixing the second DUV radiation with the third fundamental wavelength radiation to generate a third DUV radiation having a wavelength between approximately 192.5 nm and 194.5 nm.

In a preferred embodiment, the first, second and third laser beams of radiation are continuously outputted, and the third DUV radiation of 193.4 nm or around 193.4 nm is outputted continuously.

Advantageous Effects of Invention

According to the present invention, a radiation apparatus which generates a 193.4 nm wavelength DUV beam by a high efficiency is realized.

BRIEF DESCRIPTION OF DRAWINGS

FIG. 3 is a table showing calculated values of a conversion coefficient in generation of a 193.4 nm wavelength DUV beam.

FIG. 6 is a table showing examples of calculation of conversion coefficients in generation of a 234.9 nm beam.

FIG. 14 is a view showing the configuration described in PLTs 6 and 7.

FIG. 15 is a view showing the configuration described in PLT 5.

FIG. 16 is a view showing the configuration described in PLT 8.

DESCRIPTION OF EMBODIMENTS

Below, an embodiment of the present invention will be explained with reference to the drawings. In the following explanation, the preferred embodiment of the present invention shows one example. The scope of the present invention is not limited to the following embodiment. In the following explanation, members assigned the same reference notations perform substantially the same actions.

Figure 1:
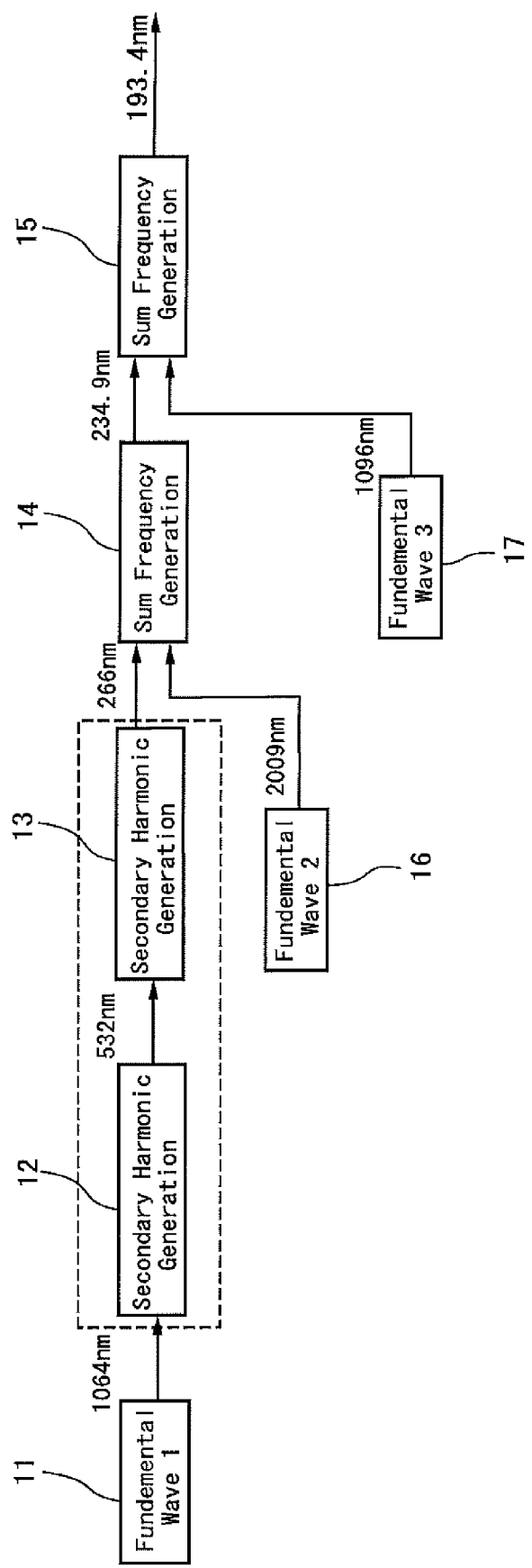
FIG. 1 is a diagram showing one example of a radiation apparatus according to the present invention.

FIG. 1 shows the configuration of one example of a radiation apparatus according to the present invention. The radiation apparatus is provided with a first laser beam source 11, first second harmonic generator 12, second second harmonic generator 13, first sum frequency mixer 14, second sum frequency mixer 15, second laser beam source 16, and third laser beam source 17.

The first laser beam source 11 generates a first laser beam having a wavelength of 1060 to 1080 nm. For example, the first laser beam is made a laser beam having a center wavelength of 1064 nm. The first laser beam strikes the first second harmonic generator 12. The first second harmonic generator 12 multiplies the frequency of the incident laser beam to generate a second harmonic. The center wavelength of the second harmonic becomes 532 nm. The 532 nm wavelength second harmonic strikes the second second harmonic generator 13. The second second harmonic generator 13 also multiplies the frequency of the incident beam to generate a second harmonic. Accordingly, the second second harmonic generator 13 generates the fourth harmonic of the first laser beam. The wavelength range of the fourth harmonic is 265 to 270 nm. This fourth harmonic is made the first DUV beam. The first DUV beam, for example, has a center wavelength of 266 nm. The first second harmonic generator 12, for example, has a nonlinear optical crystal selected from LBO ($LiB_3O_5$), KTP ($KTiOPO_4$), and PPLN (periodically-polled lithium niobate). Further, the second second harmonic generator 13, for example, has a nonlinear optical crystal selected from BBO ($\beta$-$BaB_2O_4$) or CLBO ($CsLiB_6O_{10}$). The first and second second harmonic generators 12 and 13 form a first wavelength converting means.

The first DUV beam emitted from the first wavelength converting means strikes the first sum frequency mixer 14. The sum frequency mixer 14 also receives a second laser beam which is emitted from the second laser beam source 16. The wavelength range of the second laser beam is made 1750 to 2100 nm. As one example, the center wavelength of the second laser beam is made 2009 nm. The first sum frequency mixer 14 is a second wavelength converting means. It receives the first DUV beam and the second laser beam and generates a beam of radiation which is obtained by sum frequency mixing. That is, the first sum frequency mixer 14 uses sum frequency mixing to generate a 232 to 237 nm wavelength second DUV beam. The center wavelength of the second DUV beam, for example, is made 234.9 nm. The first sum frequency mixer 14 has an LBO crystal or BBO crystal.

The second DUV beam strikes the second sum frequency mixer 15. Further, the third laser beam which is emitted from the third laser beam source 17 also strikes the second sum frequency mixer 15. The wavelength range of the third laser beam is made 1080 to 1120 nm. Further, the center wavelength is made 1096 nm. The second sum frequency mixer 15 is a third wavelength converting means. It uses the second DUV beam and the third laser beam for sum frequency mixing to generate a 192.5 to 194.5 nm wavelength third DUV beam. This third DUV beam is the output beam of the radiation apparatus according to the present invention. The second sum frequency mixer 15 uses the incident second DUV beam and third laser beam for sum frequency mixing by a CLBO (CsLiB6O10) crystal. The third DUV beam, for example, is a DUV beam having a center wavelength of 193.4 nm and substantially corresponds to the emission wavelength of the ArF laser. In this way, the radiation apparatus according to the present invention generates a DUV beam included in the possible range of emission of the ArF laser. Note, when the center wavelength of a DUV beam which is emitted from a radiation apparatus is 193 nm to 194 nm in range, it can be called an approximately 193 nm wavelength.

The first laser beam source 11, the second laser beam source 16, and the third laser beam source 17 can be made continuous output laser beam sources. The first laser beam source 11 used, for example, can be made a ytterbium (Yb)-doped fiber laser or fiber amplifier, a neodymium (Nd)-doped solid state laser, or a neodymium (Nd)-doped solid fiber laser (or fiber amplifier). The second laser beam source 16 used, for example, can be made a thulium (Tm)-doped fiber laser (or fiber amplifier). As the third laser beam source 17, a ytterbium (Yb)-doped fiber laser (or fiber amplifier) can be used.

The wavelength of the first DUV beam is made a 266 nm or nearby wavelength, the wavelength of the second DUV beam is made a 234.9 nm or nearby wavelength, and the wavelength of the third DUV beam is made a 193.4 nm or nearby wavelength. Due to this, it is possible to generate a DUV beam substantially matching the emission wavelength of an ArF laser. The radiation apparatus according to the present embodiment is suitable as a beam source for a mask scanning apparatus which uses a DUV beam to inspect a photomask. That is, the wavelength of the inspection beam can be made the same wavelength as the exposure wavelength for exposure of a pattern, so more accurate mask inspection becomes possible. A photomask scanning apparatus is provided with a radiation apparatus and an optical system which fires a DUV beam which is emitted from a radiation apparatus to a sample, that is, a mask (including a mask blank). Further, a DUV beam is irradiated from the radiation apparatus to the sample, and a beam reflected from or a beam passing through the mask is received by beam detection means, and the output signal from a beam detecting means is processed to perform the inspection. According to the present invention, it is possible to efficiently generate a DUV beam of the same wavelength as the illumination beam emitted from the illumination beam source of an exposure apparatus, that is, from an ArF laser. According, it is possible to use an inspection beam of the same wavelength as the wavelength of the exposure beam to inspect a mask. Below, a concrete example of the configuration of a radiation apparatus according to the present invention and its effects will be explained in detail.

First, sum frequency mixing in the third wavelength converting means which emits a 193.4 nm output beam will be explained. In the present invention, in the third wavelength converting means, a CLBO crystal is used. A CLBO crystal is a crystal which is optimal for generation of a high output DUV beam. First, regarding a CLBO crystal, NPLT 10 (J. Sakuma et al., "All-solid-state, 1 W, 5 kHz laser source below 200 nm", OSA Trends in Optics and Photonics, 26, pp. 89-92 (1999)) reports that that DUV beam output becomes particularly large when satisfying the conditions of "non-critical phase matching" (NCPM).

The above NPLT 10 shows that if cooling a CLBO crystal down to −180° C. so as to change the refractive index, sum frequency mixing for non-critical phase matching of a 236.3 nm wavelength beam and 1064 nm wavelength beam becomes possible and that a 193.439 nm wavelength DUV beam can be generated. Since this report, it has been reported that a CLBO crystal for NCPM operation is suitable for high efficiency wavelength conversion. For example, it has also been reported to use a CLBO crystal held at −15° C. for generation of a 473 nm beam second harmonic (David C. Gerstenberger, Thomas M. Trautmann, Mark Bowers, "Non-critically phase-matched second-harmonic generation in cesium lithium borate", Optics Letters, Vol. 28 Issue 14, pp. 1242-1244 (2003)).

Figure 2:
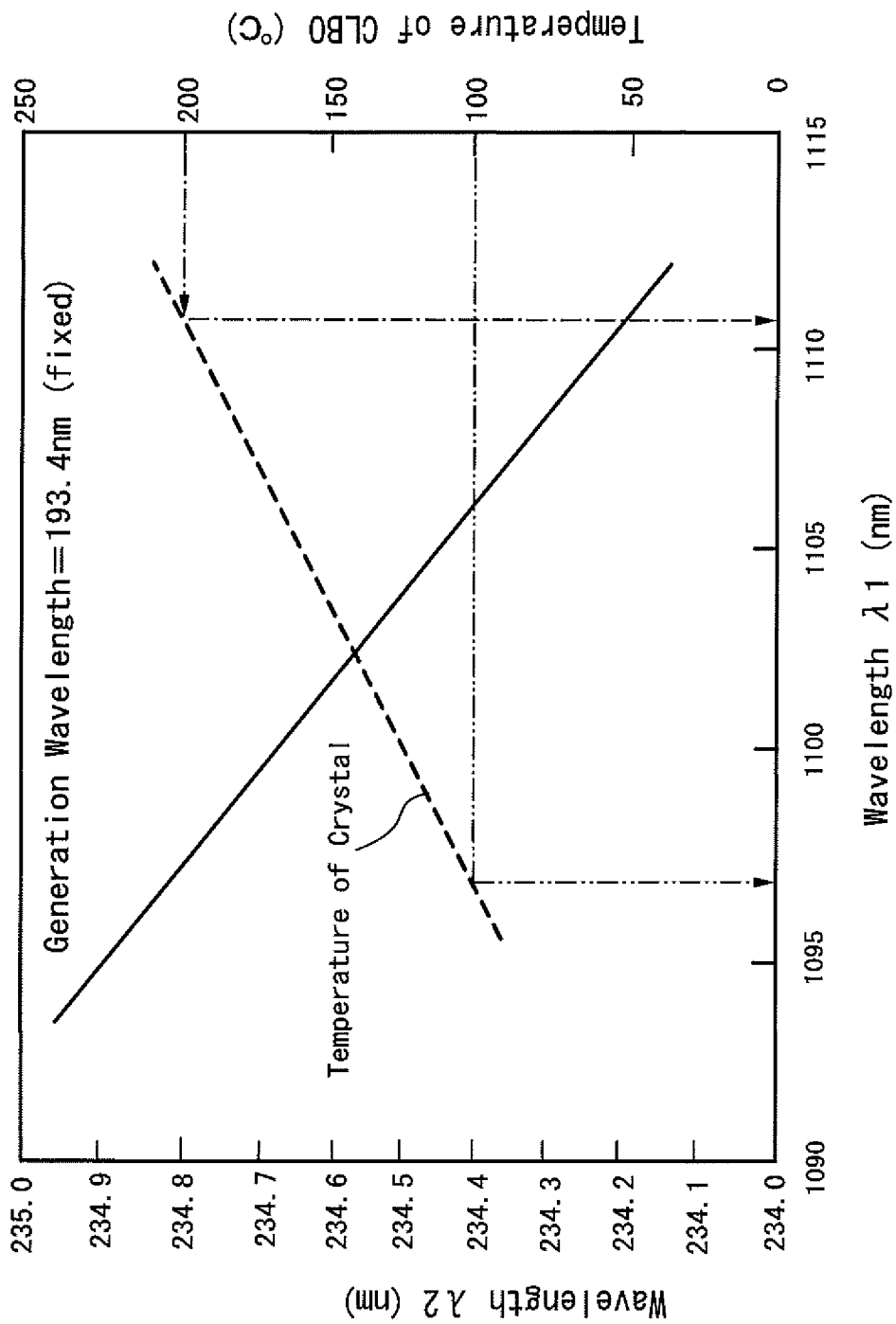
FIG. 2 is a graph showing the relationship between a wavelength of an incident beam when using sum frequency mixing using a non-critical phase matching CLBO crystal so as to generate a 193.4 nm wavelength DUV beam and a crystal temperature.

However, a CLBO crystal is preferably utilized while heated to above the boiling point of water, that is, 100° C., so as to prevent degradation of the hygroscopicity. Use cooled to −180° C. is not practical. Therefore, let us study the relationship between the crystal temperature for non-critical phase matching and the incident wavelength of a beam for a CLBO crystal. FIG. 2 shows the relationship between the wavelength of the incident beam when using a non-critical phase matching CLBO crystal for sum frequency mixing to generate a 193.4 nm DUV beam and the crystal temperature (calculated values). In FIG. 2, the abscissa shows the wavelength $\lambda 1$ of the long wavelength side incident beam, the left side ordinate shows the wavelength $\lambda 2$ of the short wavelength side incident beam, and the right side ordinate shows the temperature of the CLBO crystal. Further, a theoretical calculation was performed using the Sellmeier Equations which express the wavelength and temperature dependency of the refractive indexes of crystals. The Sellmeier Equations are, for example, described in N. Uemura, K. Yoshida, Y. Mori, T. Sasaki, and K. Kato, "New data on the phase-matching properties of CsLiB6O10," OSATOPS Vol. 26, Advanced Solid-State Lasers, M. Fejer, H. Injeyan, and U. Keller eds., 715-719 (1999). In FIG. 2, the broken line shows the calculated value of the wavelength range of the long wavelength side beam $\lambda 1$ for a non-critical phase matching CLBO crystal to generate a 193.4 nm DUV beam, while the solid line shows the calculated value of the wavelength range of the short wavelength side beam $\lambda 2$. The practically preferable usage temperature of a CLBO crystal is about 100 to 200° C. in range. Therefore, according to calculations by the inventors, the preferable wavelength range of the long wavelength side beam $\lambda 1$ is 1096 to 1111 nm. Further, the preferable wavelength range of the short wavelength side beam $\lambda 2$ is 234.1 to 234.9 nm. As will be understood from FIG. 2, to generate a center wavelength 193.4 nm of the ArF excimer laser in the state of heating a CLBO crystal to 100° C. to 200° C. suitable for practical application, the inventors discovered that the suitable wavelength ranges of the wavelengths ($\lambda 1, \lambda 2$) of the two beams to be mixed are a wavelength of the long wavelength side beam of $1096 \text{ nm} \leq \lambda 1 \leq 1111$ nm and a wavelength of the short wavelength side beam of $234.1 \text{ nm} \leq \lambda 2 \leq 234.9$ nm. The above-mentioned PLTs (PLT 16 and PLT 17) do not satisfy this condition, so are not suited to generation of a 193.4 nm DUV beam. The conversion efficiency coefficient according to sum frequency mixing can be calculated by an equation shown in NPLT 11 (G. D. Boyd and D. A. Kleinman, "Parametric interaction of focused Gaussian light beams," J. Appl. Phys. 39, 111597-3679 (1968)), reproduced herein below as equation (3).

$$\gamma_{SFG} \cong \frac{8\omega_1\omega_2 D_{eff}^2}{\pi n_1 n_2 n_{SFG} c^3 \varepsilon_0} \cdot \frac{k_1 + k_2}{2} l.h(B, \zeta) \quad (3)$$

B in the above equation is a parameter proportional to the angle ρ which is called the "walkoff angle" of the crystal, ζ is a parameter expressing the focusing condition, Deff is an effective nonlinear constant of a crystal, and "l" is a crystal length. The calculation equation for "h" is described in the literature, but the ζ which makes "h" the maximum for the ρ which is determined from the phase matching conditions, that is, the value of B, becomes the optimum focusing condition. The smaller the ρ, the larger the "h". In particular, with a ρ=0 NCPM operation, B=0. Under the optimum focusing condition ζ=2.84 at B=0, the value of "h" becomes a maximum of 1.068. When not an NCPM operation, B>0. The value of "h" for the optimum focusing condition in that case, that is, 1.392≦ζ≦2.84, becomes smaller than 1.068. Using the conversion efficiency coefficient, the output PSFG of the sum frequency mixed beam is calculated by the following equation (4).

$$PSFG = \gamma SFG\ P1 \times P2 \quad (4)$$

P1 and P2 are outputs of beams of wavelengths λ1 and λ2 striking the sum frequency mixer. When using particularly low intensity continuous output laser beams for sum frequency mixing, it is important to as much as possible maximize "h", that is, satisfy the optimum focusing condition. The crystal length of the CLBO crystal is made the 20 mm enabling easy acquisition of a high quality crystal. The results of calculation of the conversion efficiency coefficients under the optimum focusing conditions including the above known examples are shown in FIG. 3 as Table 1.

As will be understood from Table 1, when using two wavelength beams of λ1=1096 nm and λ2=234.9 nm for sum frequency mixing to generate a 193.4 nm wavelength DUV beam, a CLBO crystal which is heated to close to 100° C. operates by non-critical phase matching. Its conversion coefficient becomes considerably larger than with the known examples. For example, when making the wavelengths of the two beams which strike the sum frequency mixer λ1=1111 nm and λ2=234.1 nm, a CLBO crystal engages in NCPM operation if raised to about 200° C. resulting in a similar conversion efficiency. Based on the results of these studies, in the present example, as a wavelength converting means for generating a 193.4 nm DUV beam, a sum frequency mixer which has a CLBO crystal is used. A λ1=1096 to 1111 nm wavelength beam and a λ2=234.1 to 234.9 nm wavelength beam are used.

Figure 4:
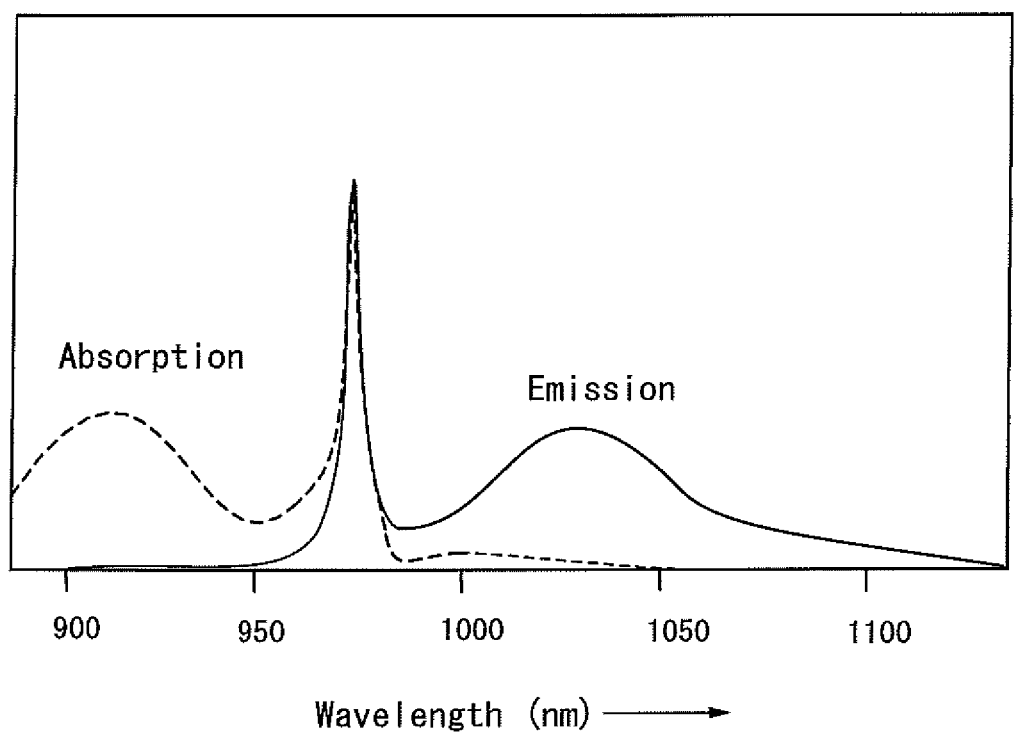
FIG. 4 is a graph showing an absorption-emission spectrum of a ytterbium (Yb)-doped fiber.

Therefore, we will study if there are actually means for obtaining a λ1=1096 to 1111 nm wavelength beam and a λ2=234.1 to 234.9 nm wavelength beam. For a λ1=1096 to 1111 nm wavelength beam, there is the recently frequently used ytterbium (Yb)-doped fiber laser. FIG. 4 shows the emission spectrum of a ytterbium-doped fiber laser. As shown in FIG. 4, a ytterbium-doped fiber laser has a gain in the 1030 to 1120 nm wavelength region. Emission and amplification are sufficiently possible at close to 1100 nm wavelength. A ytterbium (Yb)-doped fiber laser or fiber amplifier has a high gain near 1064 nm, which is also the emission wavelength of a neodymium (Nd)-doped solid state laser or fiber laser (fiber amplifier), and is easy to be raised to a high output of several tens of watts. However, the gain with a wavelength near 1100 nm is low, so raising the output cannot be said to be easy. This is necessary to consider in practical application. On the other hand, to generate a 234.1 to 234.9 nm wavelength beam, it is necessary to rely on the wavelength conversion shown in the following equation (5).

$$1/\lambda 1 + 1/\lambda 2 = 1/\lambda 3 \quad (5)$$

As combinations of the wavelengths λ1 and λ2 of the two wavelength beams for sum frequency mixing shown in equation (5), the following combinations may be considered.
(1) Sum frequency mixing of λ1 to 700 nm beam from titanium sapphire laser etc. and third harmonic λ2 to 355 nm of fundamental wave which is output from ytterbium (Yb)-doped solid state laser or fiber laser (or amplifier) (NPLT 10)
(2) Sum frequency mixing of λ1 to 1.55 μm wavelength beam from erbium (Er)-doped fiber laser (or fiber amplifier) and fourth harmonic (λ2 to 277 nm) of fundamental wave which is output from ytterbium (Yb)-doped solid state laser or fiber laser (or fiber amplifier) (PLT 7)
(3) Sum frequency mixing of λ1 to 2.0 μm wavelength beam from thulium (Tm)-doped fiber laser (or fiber amplifier) and fourth harmonic (λ2 to 266 nm) of fundamental wave which is output from ytterbium (Yb)-doped solid state laser or fiber laser (or fiber amplifier)
Further, as generation of the harmonic by frequency multiplication, there is the method shown in (4):
(4) Generation of second harmonic of 470 nm wavelength fundamental wave which is output from presidium (Pr)-doped solid state laser etc.

Among these, the praseodymium (Pr)-doped solid state laser of (4) is full of promise in terms of future applications, but is currently in the research stage and has not yet been practically produced. Further, the titanium sapphire laser of (1) is a complicated device and is not suited for industrial applications such as semiconductor production where high reliability is demanded. As the system of (2), PLT 7 shows a system for generation of a 234.4 nm DUV beam by sum frequency mixing of the fourth harmonic (about 276 nm) of the 1105 nm beam from a ytterbium (Yb)-doped fiber laser (or amplifier) and the 1.55 μm beam from an erbium (Er)-doped fiber laser (or amplifier) by a BBO crystal. On the other hand, in the case of the system of (3), a beam source which generates in particular a 266 nm wavelength DUV beam as the fourth harmonic of a ytterbium (Yb)-doped fiber laser (or amplifier) or neodymium (Nd)-doped solid state laser or fiber laser (or fiber amplifier) is being broadly applied in practice. Based on these studies, in the present invention, as the short wavelength side beam for entering the second wavelength converting means, a 266 nm wavelength DUV beam is used.

Figure 5:
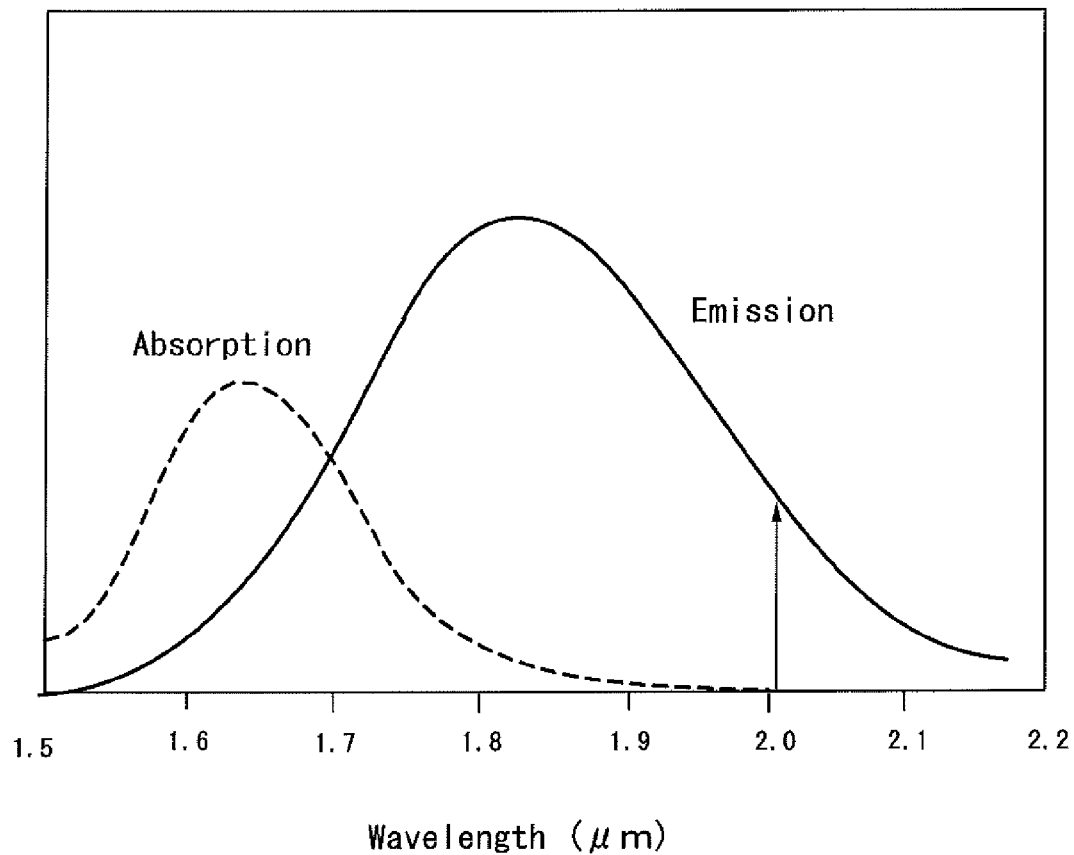
FIG. 5 is a graph showing an absorption-emission spectrum of a thulium (Tm)-doped fiber.

When using as the short wavelength side beam a λ2=266 nm wavelength beam, the long wavelength side wavelength for generating a 234.1 to 234.9 nm wavelength beam by sum frequency mixing becomes λ1=1950 to 2010 nm. This wavelength beam can be generated by various laser beam sources. As one example, it can be easily generated by a thulium (Tm)-doped fiber laser or amplifier. FIG. 5 shows the emission spectrum of a thulium (Tm)-doped fiber laser. As shown in FIG. 5, a λ1=1950 to 2010 nm wavelength beam can be easily output by a thulium (Tm)-doped fiber laser or amplifier. As nonlinear optical crystals for sum frequency mixing using λ1=1950 to 2010 nm and λ2=266 nm wavelength beams, there are a LBO crystal, CLBO crystal, and BBO crystal. The calculated values of the conversion coefficients in the sum frequency mixings of the above (2) and (3) at the optimum focus in the cases of use of these crystals are shown in FIG. 6 as Table 2.

Figure 7:
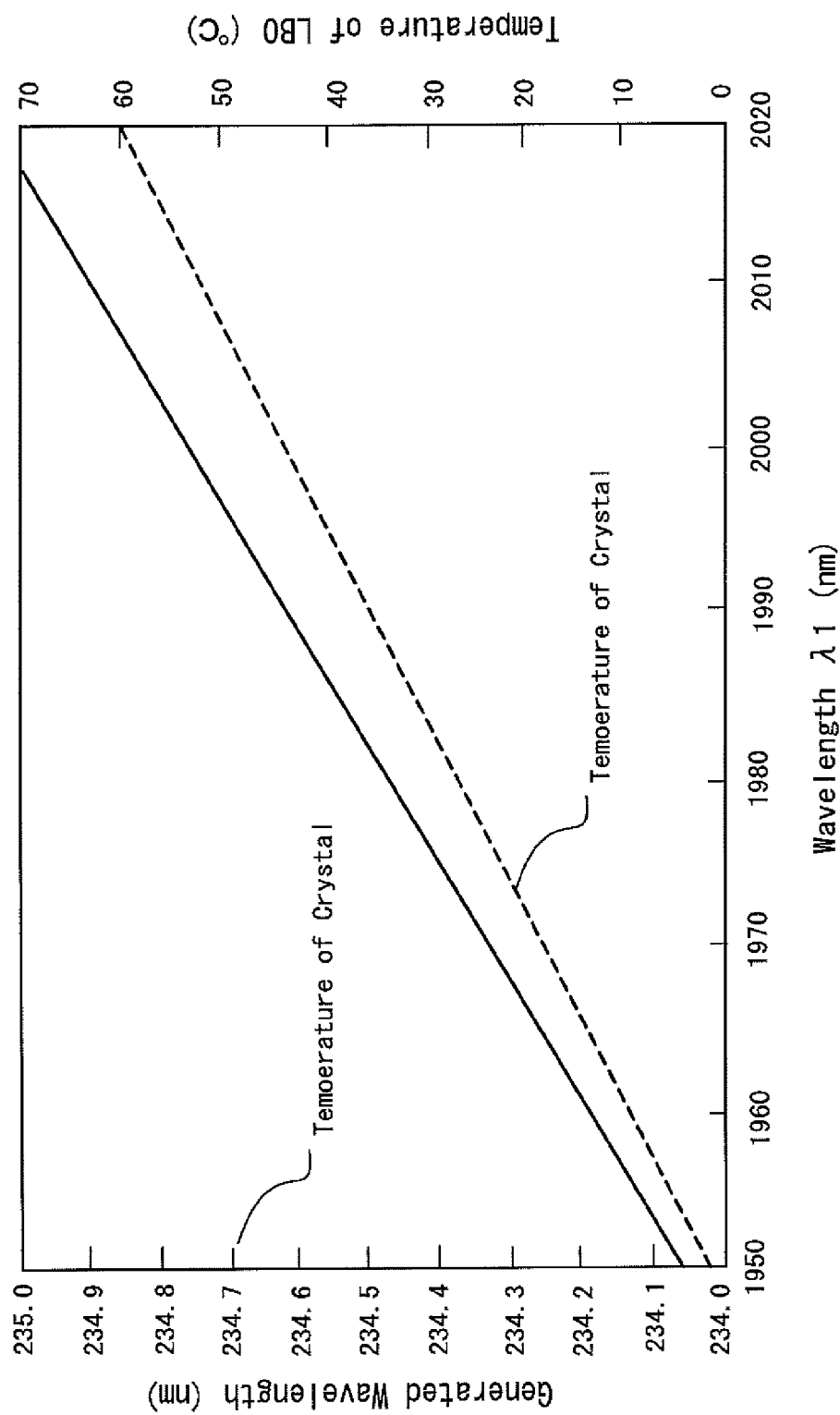
FIG. 7 is a graph showing the relationship between a generated wavelength when using an NCPM LBO crystal for sum frequency mixing with a 266 nm beam and a crystal temperature.

In the calculations, all crystals are assumed to have a length of 20 mm—the size easily obtainable in general. However, a BBO crystal and LBO crystal are usually given antireflection films at the incident and emission end faces. The loss is estimated to be generally 1%. In general, with a perpendicular incidence type given an antireflection film, the laser beam will not spread inside the crystal, so the conversion efficiency will be high, but with a CLBO crystal, use of an antireflection film is difficult, so a Brewster type is assumed. As shown in FIG. 6, with both a BBO crystal and LBO crystal, sum frequency mixing is used for wavelength conversion. In particular, in the case of an LBO crystal, with generation of 234.9 nm by sum frequency mixing of $\lambda 1=2009$ nm and $\lambda 2=266$ nm, an NCPM operation results near 52° C. and the conversion efficiency coefficient becomes higher than otherwise. If changing $\lambda 1=2009$ nm to 1950 nm, the wavelength of the beam which is generated by sum frequency mixing becomes 234.1 nm. FIG. 7 shows the relationship of the range of emission of the wavelength $\lambda 3$ of the beam generated by sum frequency mixing when fixing the short wavelength side wavelength $\lambda 2$ at $\lambda 2=266$ nm and changing the long wavelength side wavelength $\lambda 1$ to the wavelength $\lambda 1=1950$ to 2010 nm and the temperature of the LBO crystal for obtaining an NCPM operation for this sum frequency mixing. In FIG. 7, the solid line shows the wavelength range of the output wavelength $\lambda 3$, while the broken line shows the temperature of the non-critical phase matching LBO crystal.

Here, the generation wavelength $\lambda 3$ by sum frequency mixing is shown by the following equation (6).

$$1/\lambda 3=1/\lambda 1+1/266 \tag{6}$$

As shown in FIG. 7, an LBO crystal performs non-critical phase matching at a temperature of 1° C. for a wavelength $\lambda 1=1950$ nm. Even in this state, operation is possible. However, measures are necessary against condensation etc., so in actuality, it is preferable to set the wavelength to the 1970 nm giving an NCPM operation at room temperature.

On the other hand, in the sum frequency mixing of the 276 nm and 1.55 µm beam shown in PLT 17, even if using an LBO crystal, an NCPM operation cannot be obtained. Rather, a BBO crystal becomes higher in conversion efficiency. However, use of sum frequency mixing of $\lambda 1=1950$ to 2009 nm and $\lambda 2=266$ nm by an NCPM operating LBO crystal to generate a 234.1 to 234.9 nm beam gives a considerably high conversion efficiency.

In the above way, as the first sum frequency mixing, using sum frequency mixing of an output beam of a generation wavelength 1950 to 2009 nm vicinity thulium (Tm)-doped fiber laser (TDFL) or amplifier (TDFA) and 266 nm wavelength DUV beam obtained by generation of the fourth harmonic of a laser beam with a generation wavelength of close to 1064 nm utilizing an LBO crystal or BBO crystal so as to generate a 234.9 nm DUV beam and, as second sum frequency mixing, using sum frequency mixing of that DUV beam and an output beam of an emission wavelength 1096 to 1111 nm vicinity ytterbium (Yb)-doped fiber laser (YDFL) or amplifier (YDFA) by a CLBO crystal enable realization of an extremely high efficiency 193.4 nm beam source, the inventors discovered.

As the 1064 nm beam source for generation of 266 nm, aside from a YDFL and a YDFA, a neodymium (Nd)-doped fiber laser, fiber amplifier, or solid state laser is also sufficiently practical.

The conventional known examples all use one or two laser beam sources to generate DUV beams near 193.4 nm and at first glance are suitable for reduction of size. However, the configuration of the present invention is far higher in conversion efficiency, so the structure of the apparatus conversely becomes smaller in size. On top of this, there is the feature that construction of the external resonator required for generation of a continuous output 193.4 nm DUV beam becomes easy. To use sum frequency mixing to obtain continuous output wavelength converted light, there is the method of using an external resonator to increase the long wavelength side beam, arrange a nonlinear optical crystal inside the resonator, and pass the short wavelength side beam through the crystal by a single pass (PLT 1 etc.)

Figure 8:
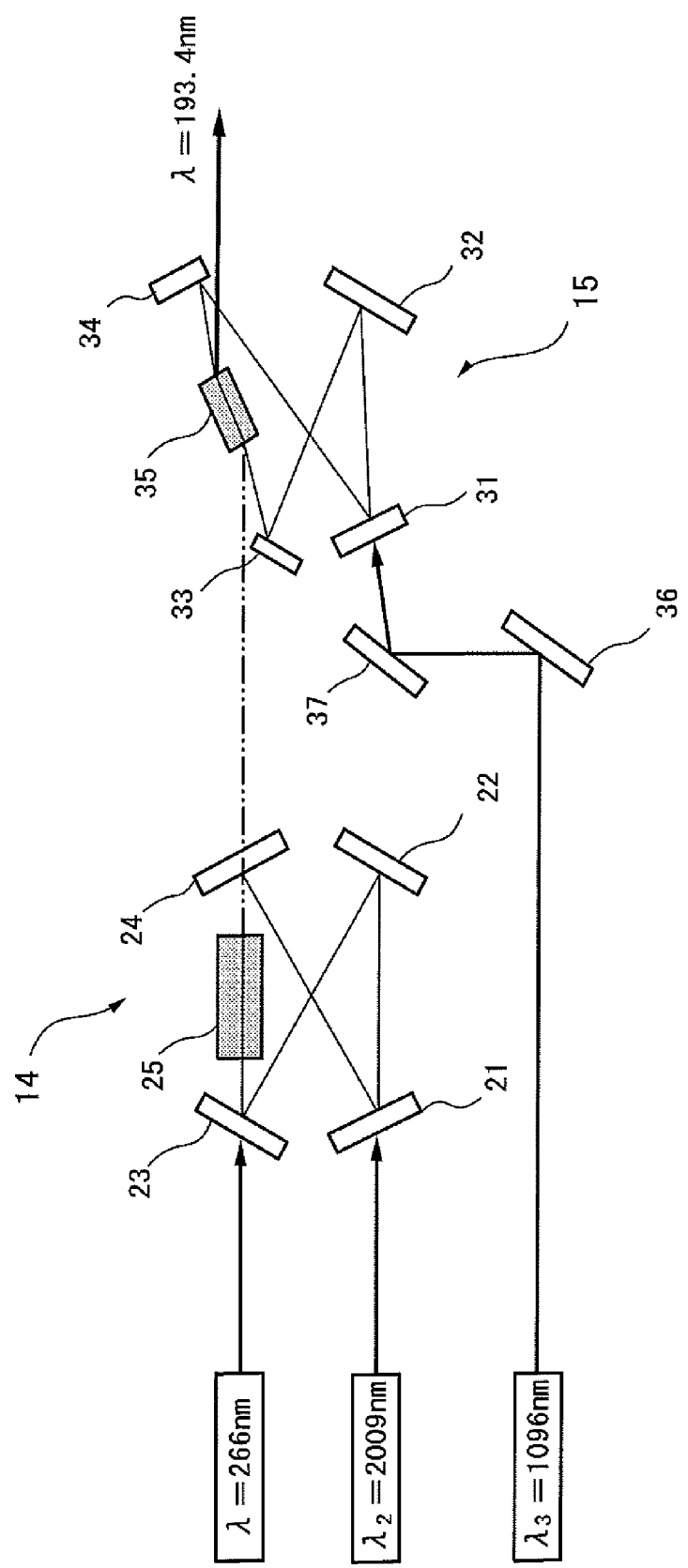
FIG. 8 is a view showing the arrangement of a beam resonator and nonlinear optical crystal used in a radiation apparatus according to the present invention.

An example of the configuration of a radiation apparatus which uses such single resonance type sum frequency mixing to generate a continuous output 193.4 nm DUV beam is shown in FIG. 8. FIG. 8 is a view schematically showing the configuration of the first and second sum frequency mixers 14 and 15. In FIG. 8, the first sum frequency mixer 14 which generates a 234.9 nm wavelength second DUV beam and the sum frequency mixer 15 which generates a 193.4 nm wavelength third DUV beam respectively use external resonators comprised of four optical mirrors. For example, the first sum frequency mixer 14 is provided with an optical mirror 21, optical mirror 22, optical mirror 23, optical mirror 24, and LBO crystal 25. Further, the second DUV beam (center wavelength 266 nm) and the second laser beam (center wavelength 2009 nm) enter the external resonator of the first sum frequency mixer 14. The LBO crystal 25 which is arranged between the optical mirror 23 and the optical mirror 24 is used to generate the sum frequency. Further, the sum frequency generated by the first sum frequency mixer 14 (center wavelength 234.9 nm) enters the second sum frequency mixer 15.

In the same way, the second sum frequency mixer 15 is provided with an optical mirror 31, optical mirror 32, optical mirror 33, optical mirror 34, and CLBO crystal 35. The third laser beam (center wavelength 1096 nm) passes through the optical mirrors 36 and 37 and enters the external resonator of the second sum frequency mixer 15. The CLBO crystal 35 which is arranged between the optical mirror 33 and the optical mirror 34 is used to generate a sum frequency. Further, the sum frequency of the center wavelength 193.4 nm generated by the second sum frequency mixer 15 is output from the radiation apparatus.

A 234.9 nm generation-use LBO crystal 25 is made a block shape given antireflection films at its incident and emission faces and resonates a 2009 nm beam. It is shown that the first DUV beam (266 nm beam) is passed through the crystal by a single pass. The LBO crystal may be a Brewster cut type or may be a lower efficiency BBO crystal or other crystal.

To make 2009 nm beam resonate at an external resonator, it is sufficient to use a beam narrowed in band by a DFB (distribution feedback) laser etc. amplified by a TDFA or TDFL narrowed in band using a fiber Bragg grating. The external resonator is maintained in resonating ability by holding the resonator length to a whole multiple of the incident beam wavelength under the control method called the PDH type (R. W. P. Dreyer, J. L. Hall, F. V. Kowalski, J. Hough, G. M. Ford, A. J. Munley, and H. Ward, "Laser phase and frequency stabilization using an optical resonator," Applied Physics B 31 (2), 97-105 (1983)) or the HC method (T. W. Hansch and B. Couillaud, Opt. Commun. 35, 441 (1980)). Each is a widely used general technique, so in the drawing, the necessary optical elements and electrical circuits are omitted. Further, the number of optical mirrors which are used for the resonators need only be three or more.

The 193.4 nm generation-use CLBO crystal 35 is made a Brewster cut type. The 1096 nm wavelength beam is made to resonate, while the 234.9 nm second DUV beam is passed by a single pass so as to generate a 193.4 nm third DUV beam.

For the 1096 nm wavelength third laser beam, like the 2009 nm laser beam, it is possible to use a DFB laser beam amplified by a ytterbium (Yb)-doped fiber amplifier (YDFA) or a laser beam which is output from a ytterbium (Yb)-doped fiber laser (YDFL) narrowed in band by an FBG. The CLBO crystal may also be made a block shape when an antireflection film is formed at its end faces. The continuous output 193.4 nm DUV beam generated in this way becomes a narrow range beam of the line width MHz range suitable for semiconductor inspection.

Figure 9:
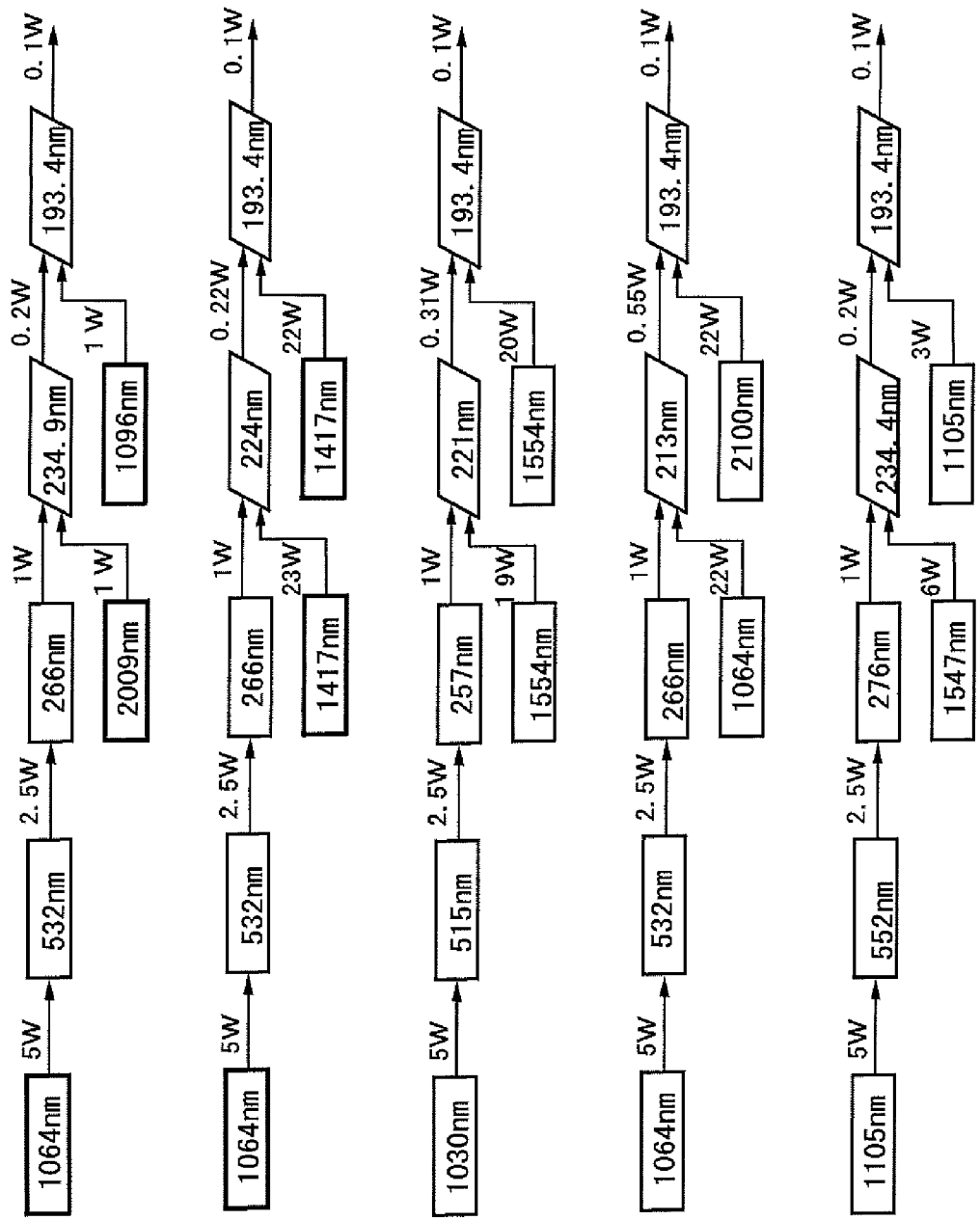
FIG. 9 is a view showing examples of calculation of outputs of beam sources required for generation of a 100 mW continuous output 193.4 nm beam.

The degree of increase of the beam intensity by an external resonator depends on the performance of the optical mirrors forming the resonator etc., but in general can be made 40 to 100 times greater. Assuming a low 40×, the beam outputs required for generation of a 100 mW 193.4 nm DUV beam in the radiation apparatus of the present invention and the known examples are evaluated. The results of evaluation are shown in FIG. 9. In FIG. 9, (A) shows the beam outputs of the radiation apparatus according to the present invention, while (B) to (E) show the beam outputs according to the known examples.

The known examples up to here all use one or two laser beam sources. However, construction of a continuous output beam source becomes difficult, so in the evaluation shown in FIG. 9, three sources are considered used in all cases for calculation. The 266 nm, 257 nm, and 278 nm outputs which are used for these systems are the same on the point of being the 1 W of the level of commercial products. As the crystals for sum frequency mixing use, length 20 mm LBO to CLBO where the efficiency becomes highest in calculation with respect to the conversion were assumed. In the case of a CLBO crystal, application of an antireflection film is difficult, so the crystal is assumed to be a Brewster cut and the loss due to Fresnel reflection at the emission end face is considered. The diamond shaped device in FIG. 9 shows the CLBO.

As shown in FIG. 9, in the present invention, the efficiency of generation of 266 nm to 193.4 nm is extremely high, so as the second and the third laser beam sources, it is possible to use sources having a total output of just 2 W such as a ytterbium (Yb) fiber laser (amplifier) which generates a laser beam near 1100 nm and a thulium (Tm)-doped fiber laser (amplifier) which generates a laser beam near 2000 nm. As opposed to this, in the radiation apparatuses of the known examples, a high output beam source where the output of the second laser beam sources and the output of the third laser beam sources total 9 to 45 W is required. When using such a high output laser beam source, the power in the external resonator reaches about 1 kW, so there is the defect of a higher danger of the optical mirror forming part of the resonator being damaged. Furthermore, there is also the inconvenience that the heat generated by the absorption of beams by the nonlinear optical crystal causes the output to become unstable.

A radiation apparatus which uses a laser beam source which generates a 1105 nm wavelength laser beam (PLT 17) exhibits a higher efficiency compared with other known examples. However, it is necessary to use a ytterbium (Yb)-doped fiber laser (amplifier) to generate a low gain 1105 nm wavelength laser beam and to generate a 1 W or so high output fourth harmonic in generation of the fourth harmonic (278 nm), so practical application is not easy.

The radiation apparatus according to the present invention, which is higher in efficiency compared with these known examples, is smaller in all of power consumption, size, and cost of the beam sources than the known examples and is extremely superior when applied to scanning apparatuses etc. Furthermore, the 266 nm first DUV beam which is used in the radiation apparatus of the present invention has a wavelength by which a high output can be obtained the easiest and is easy to increase in output, that is, has expandability. Further, the operations for generation of the 234.1 to 234.9 nm second DUV beam and 193.4 nm third DUV beam in the present invention are not only both high in generation efficiency, but also are non-critical phase matching (NCPM) operations or operations close to the same where the phenomenon called "walkoff" does not occur, so no distortion in the spatial intensity distribution of the beam, called "side lobes", occurs and the beam can be easily used in various optical apparatuses. Not only the 193.4 nm third DUV beam, but also the intermediately generated 234.9 nm DUV beam are shorter in wavelength than the 266 nm wavelength DUV beam which is utilized in optical disk mastering and writing of fiber grating and other various industrial fields at the present and the 257 nm and 244 nm DUV beams generated by the second harmonic of the laser beam which is output from the argon ion laser. Therefore, the DUV beam which is emitted from the radiation apparatus according to the present invention can also be utilized for various applications or applied apparatuses due to its high generation efficiency.

The present invention is not limited to the above embodiment. Various modifications and changes may be made. For example, in the above explanation, the wavelengths for generating a DUV beam of the center wavelength 193.4 nm of an ArF excimer laser were shown, but the crystal can be adjusted in temperature or the angle can be adjusted for phase matching, so the wavelengths of the laser beam sources and the DUV beam which is output at the intermediate stage are not limited to the above wavelengths. Even if somewhat different, the targeted DUV beam can be generated. For example, to generate a 234.9 nm wavelength second DUV beam, it is possible to perform sum frequency mixing of $\lambda 1=1920$ nm and $\lambda 2=267.5$ nm by an LBO crystal. The LBO crystal in this case is not an NCPM type, but gives a higher conversion efficiency than the examples known up to now. Further, in the above embodiment, as the first laser beam source, a ytterbium (Yb)- or neodymium (Nd)-doped solid state laser or medium-doped fiber laser (or amplifier) was used and the fourth harmonic of the laser beam output from these laser beam sources was used to generate a 266 nm first DUV beam. However, these laser beam sources can output high output laser beams in the 1060 to 1080 nm wavelength range. By passing this wavelength range of laser beams through the first and second second harmonic generators, 265.25 to 270 nm wavelength range first DUV beams are output. Therefore, it is possible to use the 1060 to 1080 nm wavelength range laser beam emitted from the first laser beam source.

Figure 10:
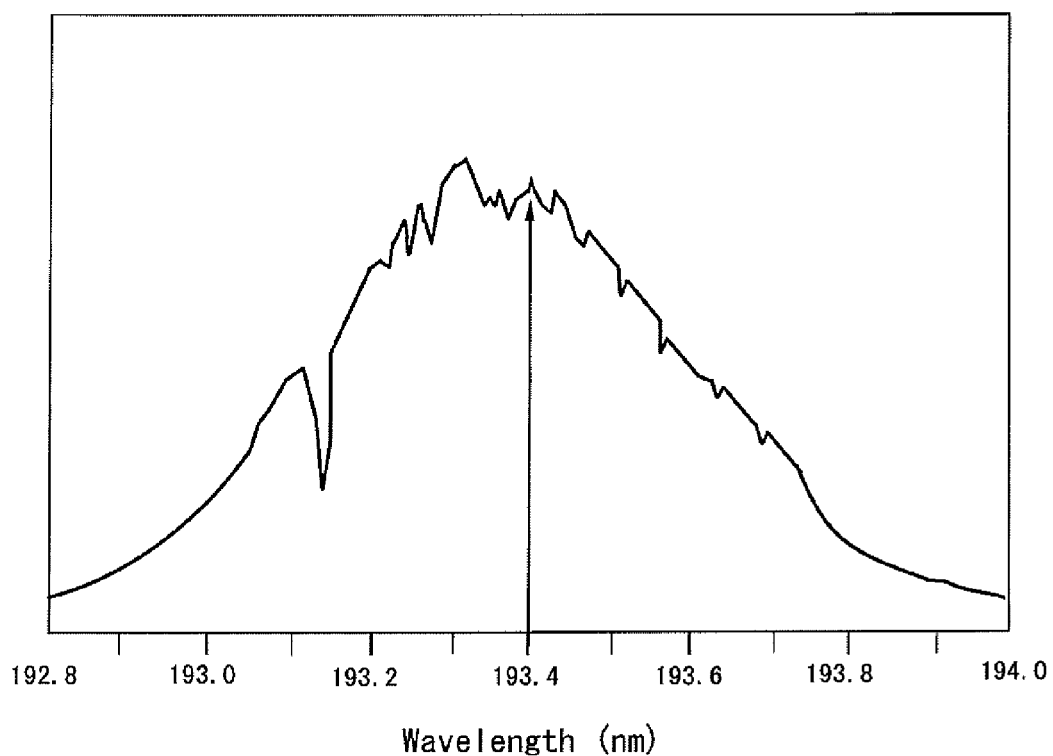
FIG. 10 is a graph showing the emission spectrum of an ArF excimer laser.
Figure 11:
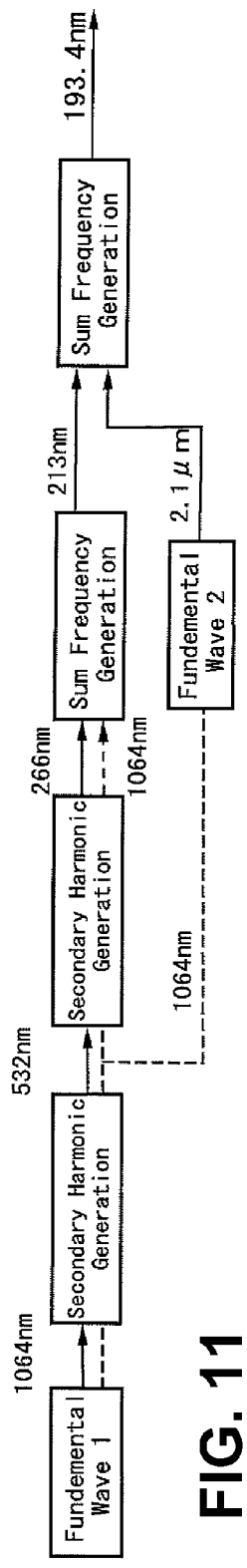
FIG. 11 is a view showing the configuration described in PLT 2.
Figure 12:
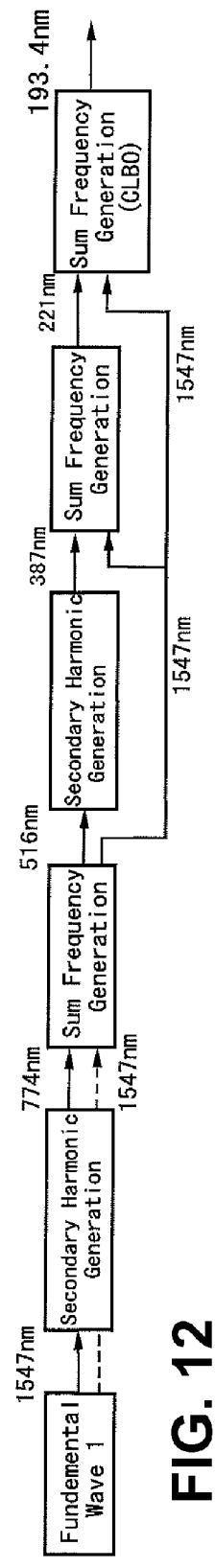
FIG. 12 is a view showing the configuration described in PLT 3.
Figure 13:
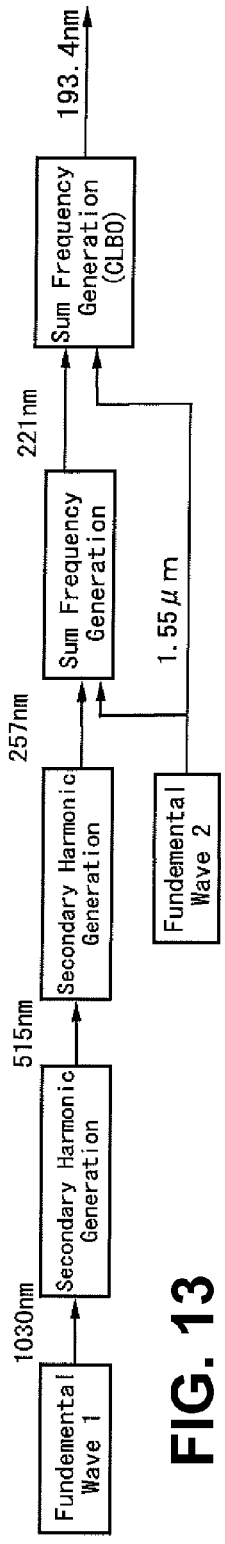
FIG. 13 is a view showing the configuration described in PLTs 4 and 5.
Figure 17:
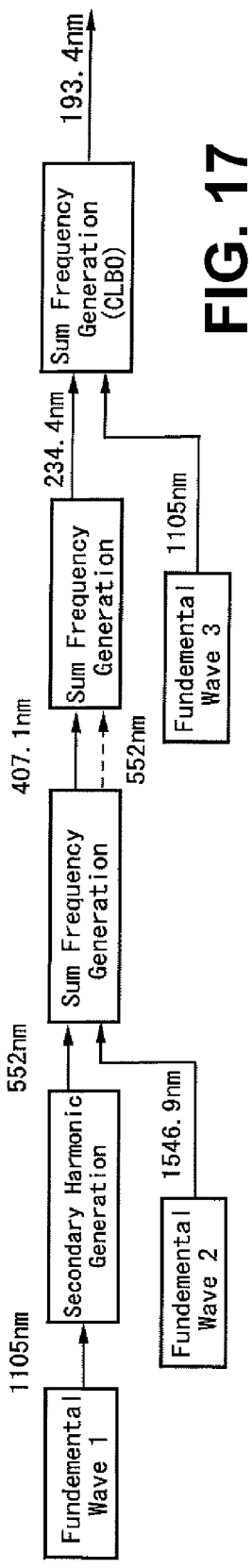
FIG. 17 is a view showing the configuration described in PLT 11.
Figure 18:
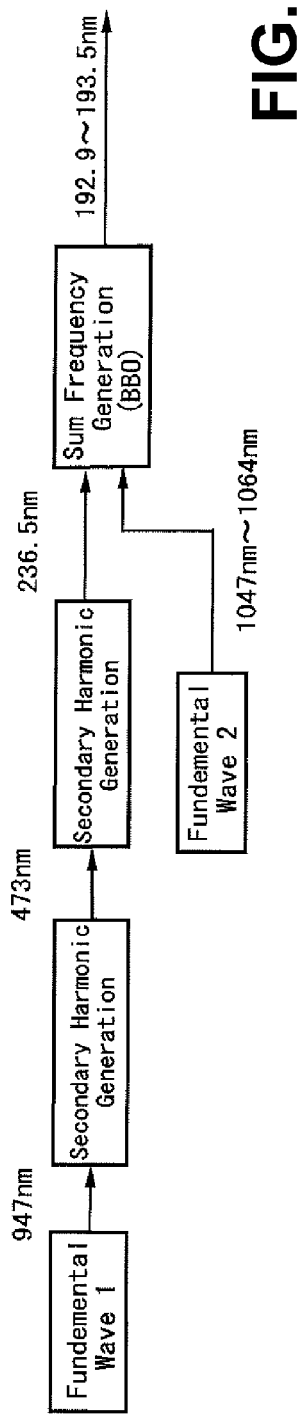
FIG. 18 is a view showing the configuration described in PLT 8.
Figure 19:
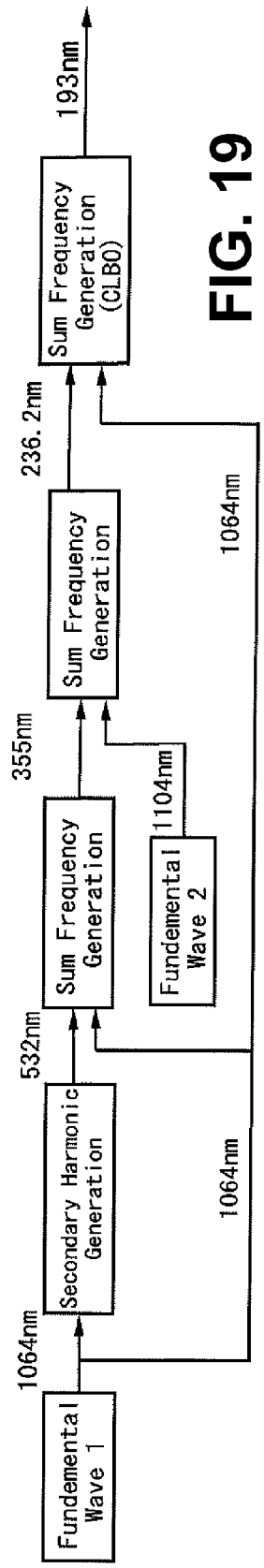
FIG. 19 is a view showing the configuration described in PLTs 9 and 10.
Figure 20:
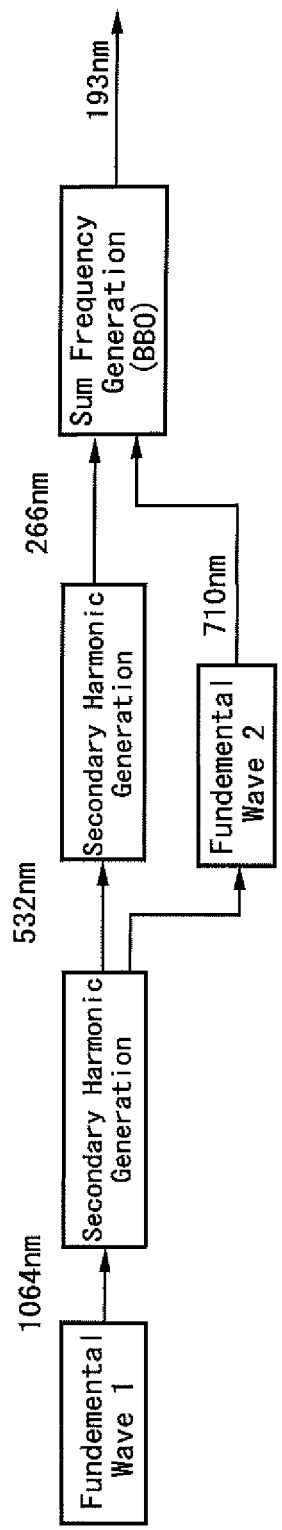
FIG. 20 is a view showing the configuration described in PLTs 11, 12, 13, and 14.

Further, in the present invention, the wavelength of the third DUV beam which is output is not limited to just 193.4 nm. It is possible to use a 192.5 to 194.5 nm wavelength range DUV beam which can be generated by an ArF excimer laser such as shown in FIG. 10. In this case, the wavelengths of the laser beam sources and the DUV beam generated at the intermediate stage sometimes differ somewhat from the above explanation. Furthermore, in the above embodiment, the explanation was made focusing on generation of a continuous output 193.4 nm beam, but it is also possible to generate a DUV beam with a high efficiency when using pulse lasers as the first to the third laser beam sources to generate a pulse 193.4 nm DUV beam. Furthermore, in the explanation of the embodiment described above, the lasers shown as examples were all fiber lasers (or fiber amplifiers) superior in beam quality directional stability etc., so stable wavelength conversion output is obtained. Further, a wavelength converter can be connected with laser beam sources by fibers, so a 193.4 nm generator can be reduced in size and maintenance ability is superior as well. However, the lasers need not be fiber lasers (or amplifiers). For example, solid state lasers comprised of an ordinary laser medium doped with ytterbium (Yb) etc. are also possible.

Note, in the above explanation of the invention, the LBO crystal and CLBO crystal used for the sum frequency mixing were both NCPM operation types, but there is no practical problem so long as close to NCPM in operation. An NCPM-use crystal usually has a cut angle of 0 degree or 90 degrees with respect to the crystal axis, but there is no problem if somewhat off from this. Further, even if the incident beam wavelength and generated beam wavelength differ somewhat from the above explanation due to the above, this is not off from the gist of the invention. Further, the wavelength and temperature for phase matching sometimes differ somewhat from the explanation due to impurities of the crystal etc., but again this is not off from the gist of the invention.

According to the present invention, it is possible to realize a radiation apparatus which is comprised of a easy to handle fiber laser (amplifier) or solid state laser and a non-special nonlinear optical crystal and which generate a 193.4 nm or nearby DUV beam by high output and by continuous output as well.

What is claimed is:

1. A radiation source apparatus for generating deep ultraviolet (DUV) radiation comprising:
   a first laser apparatus for generating a first laser beam of radiation having a first fundamental wavelength between approximately 1060 nm and 1080 nm;
   a second laser apparatus for generating a second laser beam of radiation having a second fundamental wavelength between approximately 1750 nm and 2100 nm;
   a third laser apparatus for generating a third laser beam of radiation having a third fundamental wavelength between approximately 1080 nm and 1120 nm;
   first wavelength conversion means arranged to receive the first laser beam of radiation and to generate a beam of first DUV radiation having a fourth-harmonic wavelength of the first fundamental wavelength;
   second wavelength conversion means arranged to receive the beam of first DUV radiation and the second laser beam of radiation and to sum-frequency mix the first DUV radiation with the second fundamental wavelength radiation to generate a beam of second DUV radiation having a wavelength between approximately 232 nm and 237 nm; and
   third wavelength conversion means arranged to receive the beam of second DUV radiation and the third laser beam of radiation and to sum-frequency mix the second DUV radiation with the third fundamental wavelength radiation to generate third DUV radiation having a wavelength between approximately 192.5 nm and 194.5 nm.

2. The apparatus of claim 1, wherein said first wavelength conversion means generate the first DUV radiation having the wavelength of 266 nm or around 266 nm, and the third wavelength conversion means generate the third DUV radiation having the wavelength of 193.4 nm or around 193.4 nm.

3. The apparatus of claim 2, wherein said second laser apparatus generates the second laser beam of radiation having the wavelength between 1940 nm and 2010 nm, the third laser apparatus generates the third laser beam of radiation having the wavelength between 1096 nm and 1111 nm, and the second wavelength conversion means generate the second DUV radiation having the wavelength between 234.1 nm and 234.9 nm.

4. The apparatus of claim 1, wherein said second wavelength conversion means comprise a nonlinear crystal which is selected from the group consisting of BBO (β-BaB2O4) crystal and LBO (LiB3O5) crystal.

5. The apparatus of claim 4, wherein said second wavelength conversion means comprise the BBO crystal, and the third wavelength conversion means comprise the CLBO (CsLiB6O10) crystal.

6. The apparatus of claim 4, wherein said second wavelength conversion means comprise the LBO crystal, and the third wavelength conversion means comprise the CLBO crystal.

7. The apparatus of claim 5, wherein said third wavelength conversion means comprise a non-critically phase-matched (NCPM) sum-frequency mixer device including the CLBO crystal.

8. The apparatus of claim 1, wherein said first, second and third laser apparatuses generate continuous outputs, respectively, and the third wavelength conversion means generate the continuous output having the wavelength of 193.4 nm or around 193.4 nm.

9. The apparatus of claim 7, wherein said second and third wavelength conversion means comprise an external resonator including at least three optical mirrors and a non-linear crystal arranged therein, respectively.

10. The apparatus of claim 8, wherein said second wavelength conversion means comprise the nonlinear crystal which is selected from the BBO crystal, LBO crystal, or CLBO crystal, and the third wavelength conversion means comprise the CLBO crystal.

11. The apparatus of claim 1, wherein said first wavelength conversion means comprise a first and second nonlinear crystals which are serially arranged to generate the fourth harmonic wavelength of the first fundamental wavelength.

12. The apparatus of claim 11, wherein the first nonlinear crystal is selected from the group consisting of LBO, KTP (KTiOPO4), and PPLN (periodically-polled lithium niobate), and the second crystal is selected from the group consisting of BBO and CLBO.

13. The apparatus of claim 1, wherein said first laser apparatus is selected from the group consisting of a ytterbium (Yb) doped fiber laser or fiber amplifier, a neodymium doped solid state laser, and a neodymium doped fiber laser or fiber amplifier, said second laser apparatus comprises a thulium doped fiber laser or fiber amplifier, and said third laser apparatus comprises a ytterbium (Yb) doped fiber laser or fiber amplifier.

14. The apparatus of claim 1, wherein said first, second and third laser apparatuses comprise a fiber laser or fiber amplifier, respectively.

15. The apparatus of claim 13, wherein said first laser apparatus is coupled to the second wavelength conversion means by way of an optical fiber.

16. The apparatus of claim 1, wherein said radiation source apparatus is used for an illumination source of an inspection apparatus for inspecting photo-masks.

17. A method for generating deep ultraviolet (DUV) radiation having a wavelength which is substantially equal to a wavelength of laser radiation emitted from an ArF excimer laser, comprising the steps of:
   a frequency multiplying step of receiving a first laser beam of radiation having a first fundamental wavelength between 1060 nm and 1080 nm, and generating a beam of first DUV radiation having a fourth harmonic wavelength of the first fundamental wavelength:
   a first sum frequency mixing step of receiving the beam of the first DUV radiation and a second laser beam of radiation having a second fundamental wavelength between 1750 nm and 2100 nm, and sum frequency mixing the first DUV radiation with the second fundamental wavelength radiation to generate second DUV radiation having a wavelength between 232 nm and 237 nm: and a second sum frequency mixing step of receiving the beam of the second DUV radiation and a third laser beam of radiation having a third fundamental wavelength between 1080 nm and 1120 nm, and sum frequency mixing the second DUV radiation with the third fundamental wavelength radiation to generate a third DUV radiation having a wavelength between approximately 192.5 nm and 194.5 nm.

18. The method of claim 17, wherein in the frequency multiplying step, the first DUV radiation having a wavelength of 266 nm or around 266 nm is generated, in the first sum frequency mixing step the second DUV radiation having the wavelength between 232 nm and 237 nm is generated, and in the second sum frequency mixing step, the third DUV radiation having a wavelength of 193.4 nm or around 193.4 nm is generated.

19. The method of claim 17, wherein in the frequency multiplying step, frequency multiplying is performed using two serially arranged nonlinear crystals to generate the fourth harmonic wavelength of the first fundamental wavelength.

20. The method of claim 17, wherein in the first sum frequency mixing step, the sum frequency mixing is performed using a nonlinear crystal selected from a BBO crystal, LBO crystal or CLBO crystal, and in the second sum frequency mixing step, the sum frequency mixing is performed using a CLBO crystal.

21. The method of claim 20, wherein in the second sum frequency mixing step, the sum frequency mixing is performed using the NCPM sum frequency mixer device including CLBO crystal.

22. The method of claim 17, wherein said first laser beam of radiation is generated using a laser apparatus selected from the group consisting of a ytterbium (Yb) doped fiber laser or fiber amplifier, a neodymium doped solid state laser, and a neodymium doped fiber laser or fiber amplifier, the second laser beam of radiation is generated using a thulium doped fiber laser or fiber amplifier, and the third laser beam of radiation is generated using a ytterbium (Yb) doped fiber laser or fiber amplifier.

23. The method of claim 17, wherein said first, second and third laser beams of radiation are continuously outputted, and the third DUV radiation of 193.4 nm or around 193.4 nm is outputted continuously.

* * * * *